United States Patent [19]
Ukani et al.

[11] Patent Number: 5,870,243
[45] Date of Patent: Feb. 9, 1999

[54] SERVO FRAME DEFECT MAPPING IN A HARD DISC DRIVE

[75] Inventors: Anish A. Ukani, Oklahoma City; Daniel Eugene Hobson, Yukon, both of Okla.

[73] Assignee: Seagate Technology, Inc., Scotts Valley, Calif.

[21] Appl. No.: 824,522

[22] Filed: Mar. 26, 1997

Related U.S. Application Data

[60] Provisional application No. 60/024,839 Aug. 28, 1996.
[51] Int. Cl.$^6$ .................................................. G11B 5/596
[52] U.S. Cl. ............................ 360/77.08; 360/75; 360/53
[58] Field of Search ........................... 360/75, 53, 77.08, 360/77.05, 77.02, 77.07

[56] References Cited

U.S. PATENT DOCUMENTS

| | | |
|---|---|---|
| 4,669,003 | 5/1987 | Bell et al. . |
| 4,912,585 | 3/1990 | Belser et al. . |
| 5,262,907 | 11/1993 | Duffy et al. . |
| 5,276,662 | 1/1994 | Shaver, Jr. et al. . |
| 5,475,545 | 12/1995 | Hampshire et al. . |
| 5,710,677 | 1/1998 | Teng et al. ............................ 360/77.08 |
| 5,760,990 | 6/1998 | Ukani et al. ......................... 360/77.08 |
| 5,771,131 | 6/1998 | Pirzadeh .............................. 360/77.08 |

*Primary Examiner*—Nabil Hindi
*Attorney, Agent, or Firm*—Crowe & Dunlevy

[57] ABSTRACT

Apparatus and method for detecting defective servo frames in a disc drive, the defective servo frames including anomalous position field patterns which generate burst signals of insufficient relative magnitude to facilitate proper servo control. Burst signals are generated from the position field patterns of a selected servo frame and a combination term is determined as a selected combination of the magnitudes of the burst signals. The combination term is compared to a predetermined threshold and the servo frame is identified as being defective when the combination term falls below the predetermined threshold. The combination term is preferably generated from the magnitudes of burst signals generated from three burst patterns: a first burst pattern extending from a first track boundary to a second, adjacent track boundary, a second burst pattern extending from a track centerline to the first track boundary and a third burst pattern extending from the track centerline to the second track boundary.

5 Claims, 4 Drawing Sheets

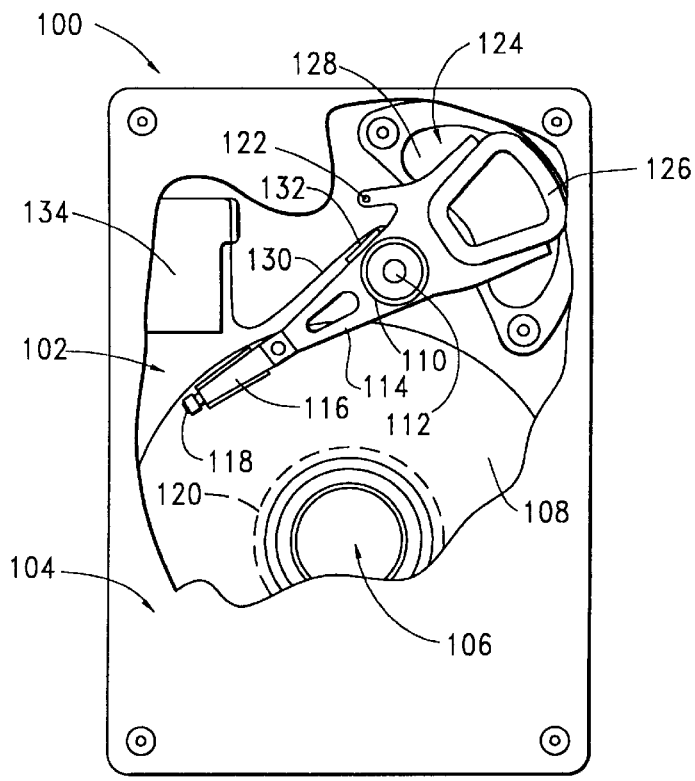
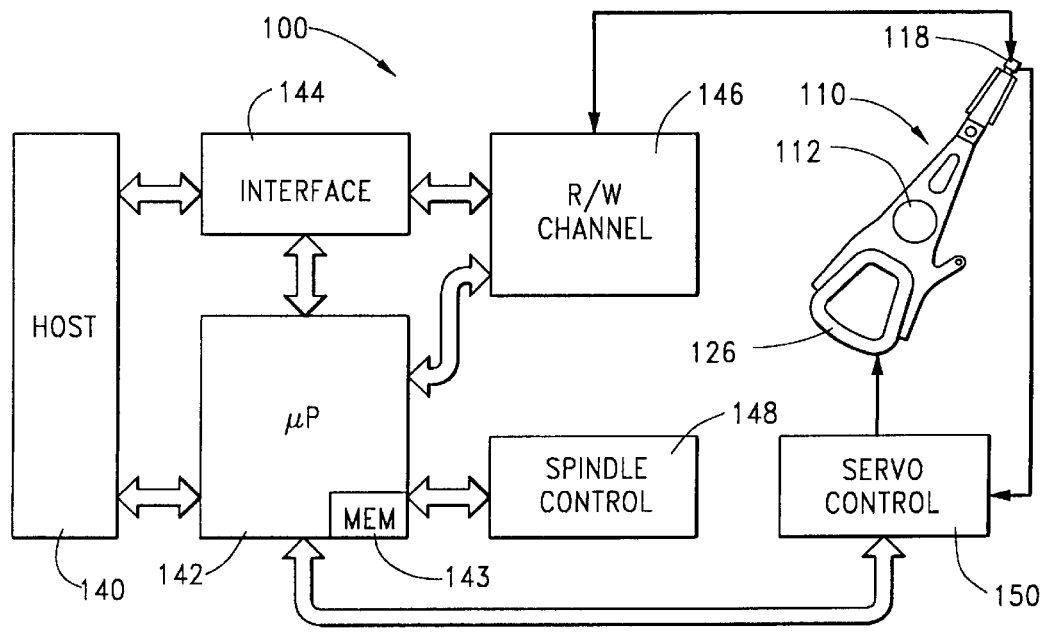
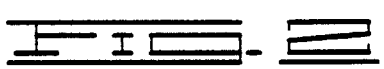

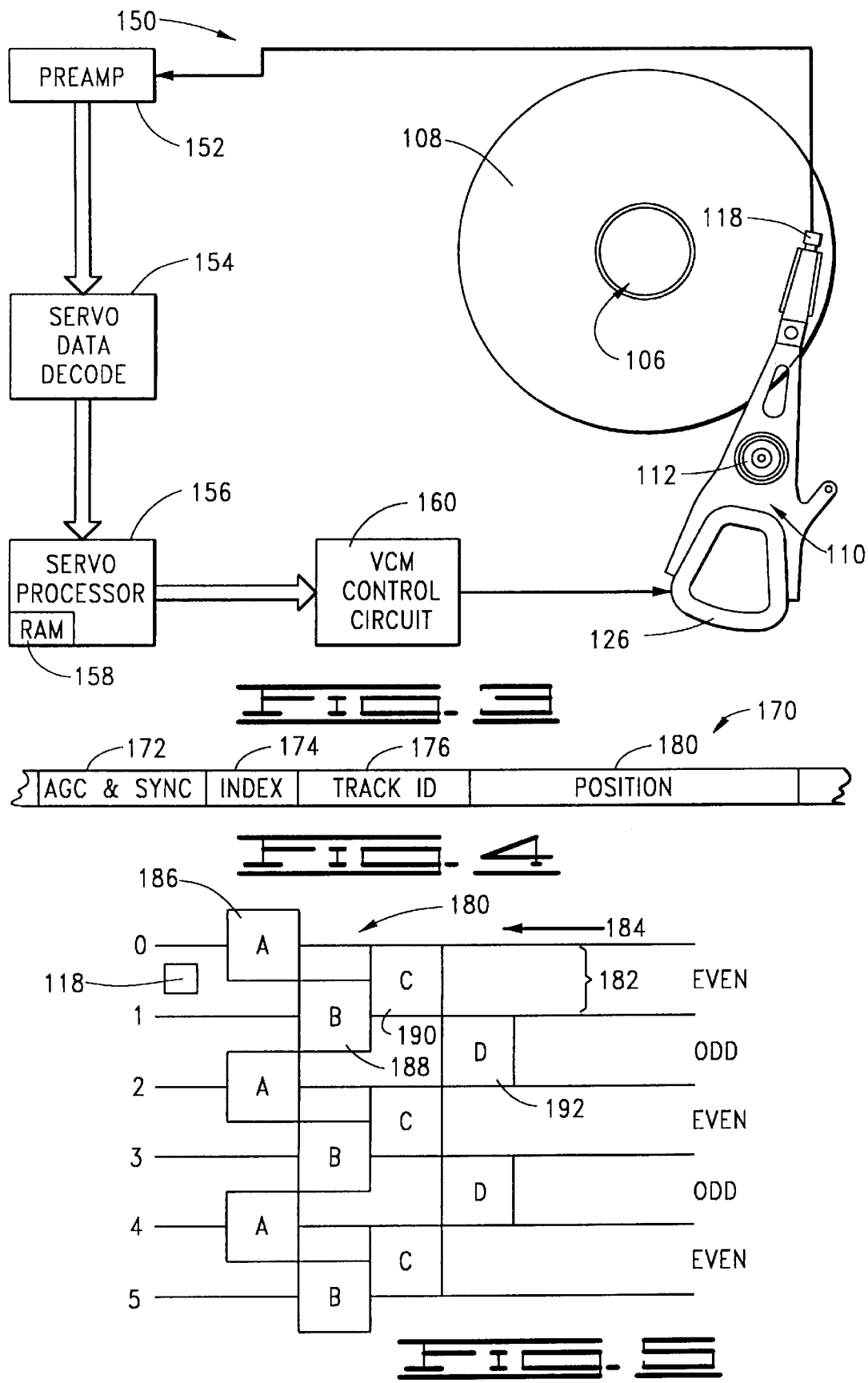

SERVO FRAME DEFECT MAPPING IN A HARD DISC DRIVE

RELATED APPLICATIONS

This application claims priority to Provisional Application Ser. No. 60/024,839 filed Aug. 28, 1996.

FIELD OF THE INVENTION

This invention relates generally to the field of disc drive data storage devices, and more particularly, but not by way of limitation, to an apparatus and method for mapping defective servo frames in a hard disc drive.

BACKGROUND OF THE INVENTION

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention. A typical servo system utilizes servo information that is written to the discs during the disc drive manufacturing process to detect and control the position of the heads through the generation of a position error signal (PES) which is indicative of the position of the head with respect to a selected track. More particularly, during track following in which the head is caused to follow a selected track, the servo system generates the PES from the received servo information and then uses the PES to generate a correction signal which is provided to a power amplifier to control the amount of current through the actuator coil, in order to adjust the position of the head accordingly.

Typically, the PES is presented as a position dependent signal having a magnitude indicative of the relative distance between the head and the center of a track and a polarity indicative of the direction of the head with respect to the track center. Thus, it is common for the PES to have normalized values corresponding to a range of, for example −1.0 to +1.0, as the head is swept across a selected track and to have a value corresponding to a value of 0 when the head is positioned over the center of the track. As will be recognized, modern servo systems typically generate the PES as a sequence of digital samples which generally correspond to the above analog range.

The PES is generated by the servo system by comparing the relative signal strengths of burst signals generated from precisely located magnetized servo fields in the servo information on the disc surface. The servo fields are generally arranged in an "offset checkerboard" pattern so that, through manipulation of the magnitudes of the burst signals provided to the servo system as the servo fields are read, the relative position of the head to a particular track center can be determined and controlled. More particularly, digital representations of the analog burst signals are typically provided to a servo loop microprocessor (or digital signal processor), which obtains a digital representation of the value of the PES from a selected combination of the input digital representations of the analog burst signals. The microprocessor then compares the value of the PES to a desired value indicative of the desired position of the head to the selected track and issues a digital correction signal to the power amplifier, which in turn provides an analog current to the actuator coil to adjust the position of the actuator accordingly.

The servo information, including the servo fields, are written to the discs during the manufacturing process using a highly precise servo track writer. Although methodologies vary in the writing of the servo information, typically the disc drive is mounted on the servo track writer and the appropriate write signals are provided to the heads of the disc drive to write the servo information while the discs are rotated by the disc drive spindle motor. A mechanical pusher arm is used to incrementally advance the heads over the surfaces of the discs while a closed loop positional control system ensures the heads are properly located relative to the discs. Depending upon a particular configuration, each servo field is typically written using a plurality of rotations of the disc, with a portion of the servo field being written during each rotation of the disc.

Although servo track writers have proven to be highly precise and reliable (sufficient to support disc drive data storage areal densities exceeding 1 Gbit/in$^2$), errors have been found to occasionally occur during servo track writing operations. For example, it is common for a servo track writer to write a selected servo field using a sinusoidal write signal of selected magnitude and phase over a plurality of passes of the head so that a portion of the field is written during each pass. If during one of the passes the servo track writer erroneously uses a sinusoidal write signal that is out of phase, the resulting servo field, though precisely located on the disc, will produce a burst signal having a reduced magnitude. Because the servo system relies upon the relative magnitudes of the servo fields, such reduction in magnitude can adversely affect the ability of the servo system to discern the location of the head with respect to the track and control the position of the head.

Moreover, localized anomalies in the media can prevent the generation of burst signals having the proper relative magnitudes, even when the servo fields have been otherwise properly formed during the servo track write operation.

Accordingly, there is a need for an improved approach to detecting the defective servo frames including anomalous position field patterns which generate burst signals of insufficient relative magnitude to facilitate proper servo control.

SUMMARY OF THE INVENTION

The present invention provides a method and apparatus for detecting defective servo frames in a disc drive, the defective servo frames including anomalous position field patterns which generate burst signals of insufficient relative magnitude to facilitate proper servo control.

In accordance with the preferred embodiment, the disc drive enters a defect mapping routine wherein burst signals are generated from the position field patterns of a selected servo frame and a combination term is determined as a selected combination of the magnitudes of the burst signals. The combination term is compared to a predetermined threshold and the servo frame is identified as defective at such time that the combination term is less than the predetermined threshold.

The combination term is preferably generated from the magnitudes of burst signals generated from three burst patterns: a first burst pattern extending from a first track boundary to a second, adjacent track boundary, a second burst pattern extending from a track centerline to the first track boundary and a third burst pattern extending from the track centerline to the second track boundary. More particularly, the combination term is preferably determined as the difference between the first pattern burst signal and the average of the second and third pattern burst signals. A one-half track offset can also be applied to the servo loop so that different combinations of the burst patterns are tested by the defect mapping routine.

These and various other features as well as advantages which characterize the present invention will be apparent from a reading of the following detailed description and a review of the associated drawings.

BRIEF DESCRIPTION OF THE DRAWINGS

FIG. 1 is a disc drive constructed in accordance with the preferred embodiment of the present invention.

FIG. 2 provides a functional block diagram of the disc drive of FIG. 1 operably connected to a host computer in which the disc drive can be mounted.

FIG. 3 provides a functional block diagram of a servo control circuit shown in FIG. 2.

FIG. 4 provides a representation of the general format of a servo frame used by the servo control circuit of FIG. 3.

FIG. 5 shows A, B, C and D burst patterns of the servo frame of FIG. 2.

DETAILED DESCRIPTION

Figure 6:
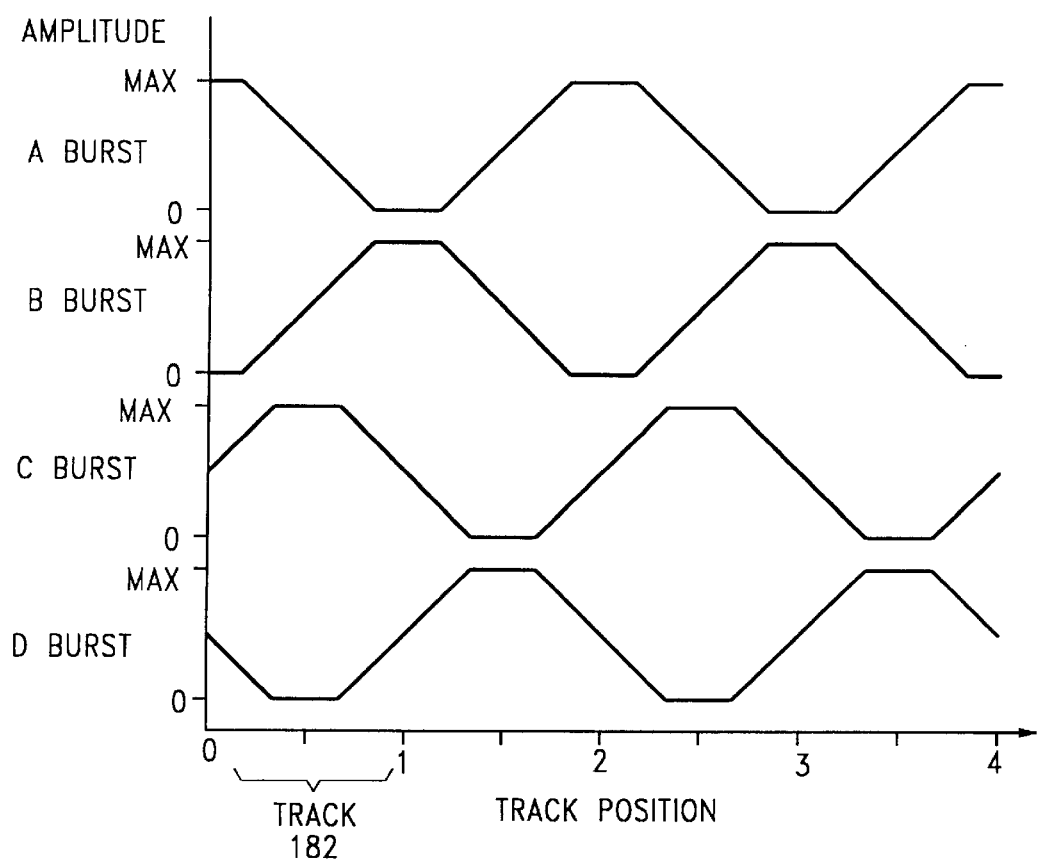
FIG. 6 provides a graphical representation of the amplitudes of A, B, C and D burst signals generated from the burst patterns of FIG. 3.

Referring now to FIG. 1, shown therein is a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

At such time that the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which as will be recognized typically includes a coil 126 attached to the actuator assembly 110 as well as one or more permanent magnets 128 which establish a magnetic field in which the coil 126 is immersed. Thus, the controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 is provided to provide the requisite electrical connection paths for the actuator assembly 110 while allowing pivotal movement of the actuator assembly 110 during operation. The flex assembly includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include RAM, ROM and other sources of resident memory for the microprocessor 142.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that have been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operation of the disc drive 100 is well known in the art and discussed, for example, in U.S. Pat. No. 5,276,622 issued Jan. 4, 1994 to Shaver et al assigned to the assignee of the present invention.

The discs 108 are rotated at a constant high speed by a spindle control circuit 148, which typically electrically commutates the spindle motor 106 (FIG. 1) through the use of back emf sensing. Spindle control circuits such as represented at 148 are well known and will therefore not be discussed further herein; additional information concerning spindle control circuits is provided in U.S. Pat. No. 5,631,999 issued May 20, 1997 to Dinsmore, assigned to the assignee of the present invention.

As discussed above, the radial position of the heads 118 is controlled through the application of current to the coil 126 of the actuator assembly 110. Such control is provided by a servo control circuit 150, a functional block diagram of which is provided in FIG. 3.

Referring now to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

It will be recognized that servo control generally includes two main types of operation: seeking and track following. A seek operation entails moving a selected head 118 from an initial track to a destination track on the associated disc surface through the initial acceleration and subsequent acceleration of the head 118 away from the initial track and towards the destination track. Once the head 118 is settled on the destination track, the disc drive enters a track following mode of operation wherein the head 118 is caused to follow the destination track until the next seek operation is to be performed. Such operations are well known in the art and are discussed, for example, in the previously referenced Duffy U.S. Pat. No. 5,262,907 as well as in U.S. Pat. No. 5,475,545 issued Dec. 12, 1995 to Hampshire et al., assigned to the assignee of the present invention. In order to clearly set forth the preferred embodiment of the present invention, however, the general operation of the servo control circuit 150 during track following will now briefly be discussed.

With continued reference to FIG. 3, analog burst signals are provided by the head 118 at such time that servo information associated with the track being followed passes under the head 118. The burst signals are amplified by the preamp circuit 152 and provided to the servo data decode circuit 154, which includes analog-to-digital converter (ADC) circuitry that converts the analog burst signals to digital form. The digitized signals are then provided to the servo processor 156, which in the preferred embodiment is a digital signal processor (DSP).

The servo processor 156 determines a position error signal from the relative magnitudes of the digital representations of the burst signals and, in accordance with commands received from the disc drive microprocessor 142 (FIG. 2), determines the desired position of the head 118 with respect to the track. It will be recognized that, generally, the optimal position for the head 118 with respect to the track being followed is over track center, but offsets (as a percentage of the width of the track) can sometimes be advantageously employed during, for example, error recovery routines. In response to the desired relative position of the head 118, the servo processor 156 outputs a current command signal to the VCM control circuit 160, which includes an actuator driver (not separately designated) that applies current of a selected magnitude and direction to the coil 126 in response to the current command signal.

The servo information on the discs 108 is recorded during the manufacturing of the disc drive 100 using a highly precise servo track writer. The servo information serves to define the boundaries of each of the tracks and is divided circumferentially into a number of frames, the general format of which is shown in FIG. 6. More particularly, FIG. 6 shows a frame 170 to comprise a plurality of fields, including an AGC & Sync field 172, an index field 174, a track ID field 176 and a position field 180. Of particular interest is the position field 180, but for purposes of clarity it will be recognized that the AGC & Sync field 172 provides input for the generation of timing signals used by the disc drive 100, the index field 174 indicates radial position of the track and the track ID field 176 provides the track address. Of course, other fields may be used as desired and the format of the fields in a servo frame will depend upon the construction of a particular disc drive.

The position field 180 comprises four position burst fields arranged in an offset, quadrature pattern for a plurality of adjacent tracks, as shown in FIG. 5. More particularly, FIG. 5 shows the position field 180 to comprise burst patterns A, B, C and D having selected geometries and magnetization vectors, defining a plurality of track boundaries identified as 0–5. Thus, each track comprises the area bounded by two adjacent track boundaries. Additionally, the head 118 of FIG. 1 is represented in FIG. 3 as being centered on the track bounded by track boundaries 0 and 1 (said track being identified at 182). The direction of rotation of the discs 108 (and hence the position field 180) relative to the head 118 is shown by arrow 184.

Both the A and B burst patterns are shown to extend from the center of one track to the center of an immediately adjacent track, with these patterns offset as shown. Additionally, the C and D burst patterns extend from one track boundary to the next track boundary, with these patterns also offset as shown. Thus, as the head 118 passes over the position field 180 on track 182, the head will pass over portions of the A and B burst patterns (identified as 186 and 188, respectively) and then over C burst pattern 190. However, the head 118 will not encounter D burst pattern 192, as this pattern is on an adjacent track. For reference, tracks having C burst patterns are referred to as "even tracks" and tracks with D burst patterns are referred to as "odd tracks".

Generally, it will be recognized that when the head 118 is centered at the mid-point of track 182, the amplitude of an A burst signal induced in the head 118 by the A burst pattern 186 will be nominally equal to the amplitude of a B burst signal induced in the head by the B burst pattern 188. Moreover, the amplitude of a C burst signal induced by the C burst pattern 190 will have a nominal maximum value and the amplitude of a D burst signal from the D burst pattern 192 will be nominally zero. Further, when the head 118 is positioned over the track boundary 1, the amplitudes of the C and D burst signals from the patterns 190 and 192 will be equal in magnitude, the B burst signal from the pattern 188 will have a maximum value and the A burst from the pattern 186 will be zero. Thus, as the head 118 is swept from one track boundary to the next, the amplitudes of the A, B, C and D burst signals cycle between zero and maximum values, as generally illustrated by FIG. 6.

FIG. 6 provides a graphical representation of the amplitudes of the A, B, C and D burst signals as the head 118 is moved from track boundary 0 to track boundary 4 in FIG. 5. More particularly, FIG. 6 plots each of the burst signals along a common horizontal axis indicative of radial track position and an aligned vertical axis indicative of the amplitude for each of the burst signals from a value of zero to a maximum value. As in FIG. 5, the track 182 is shown in FIG. 6 to comprise the interval between the values of 0 and 1 on the horizontal axis.

Figure 7:
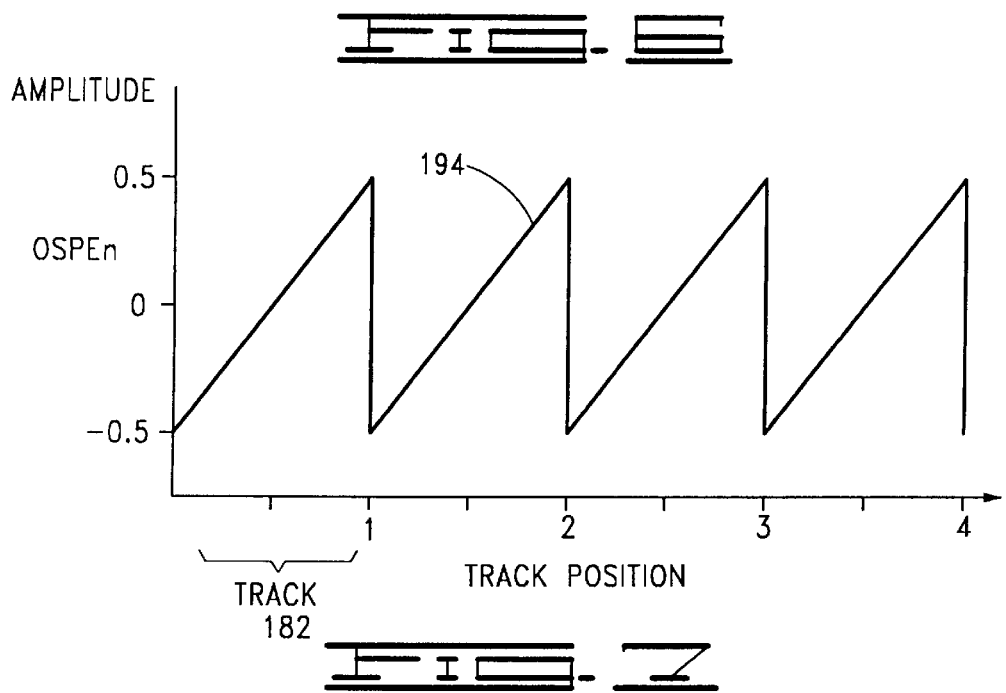
FIG. 7 shows an idealized representation of a linear position error signal generated from the burst signals of FIG. 4.

Referring to FIG. 7, shown therein is a graphical representation of an idealized PES curve 194 generated from the burst signals of FIG. 6. The PES curve 194 has an amplitude that generally ranges in a linear fashion from a minimum value of −1 to a maximum value of +1 as the head is positioned across a track from one track boundary to the next. That is, the PES has a nominal value of zero when the head 118 is positioned at the center of a selected track and the PES increases and decreases, respectively, in a linear fashion as the head is positioned toward the track boundaries. In this way, the amplitude and polarity of the PES curve 194 readily indicate the relative distance and direction of the position of the head 118 with respect to a selected track center and can thus be used to generate the appropriate correction signal to move the head to the center of the selected track. It will be understood that, in the digital servo control circuit 150 of FIGS. 2 and 3, the PES comprises a range of digital values across each track from one track boundary to the next; however, it is conventional to express the relative values of the PES in a normalized, analog fashion as shown on the vertical axis of FIG. 7.

It will be apparent that positional control of the head 118 is achieved through the discernment by the servo control circuit 150 of the relative magnitudes of the burst signals generated as the head 118 passes over the position field 180. However, should one or more of the patterns 186, 188, 190 and 192 have an improper magnetization arising as a result of an error during the servo track write process (or for other causes, such as a localized anomaly in the disc media), the relative magnitudes of the burst signals received by the servo control circuit 150 may not reflect the actual position of the head 118.

Referring again to FIG. 6, it will be noted that when the head 118 is disposed over the center of a selected track, the A and B burst signals will generally be equal in magnitude to each other within a certain tolerance and the C or D burst signal (depending upon whether the track is even or odd) will have a magnitude that is significantly greater than that of either the A or B burst signal. Particularly, with the quadrature pattern disclosed in the preferred embodiment wherein all patterns have nominally the same magnetization strength, the C or D burst signal magnitude will nominally be about twice the average of the A and B burst signal magnitudes; that is, C≈(A+B) for even tracks and D≈(A+B) for odd tracks, or for a given track, (C+D) will generally be equal to (A+B).

Figure 8:
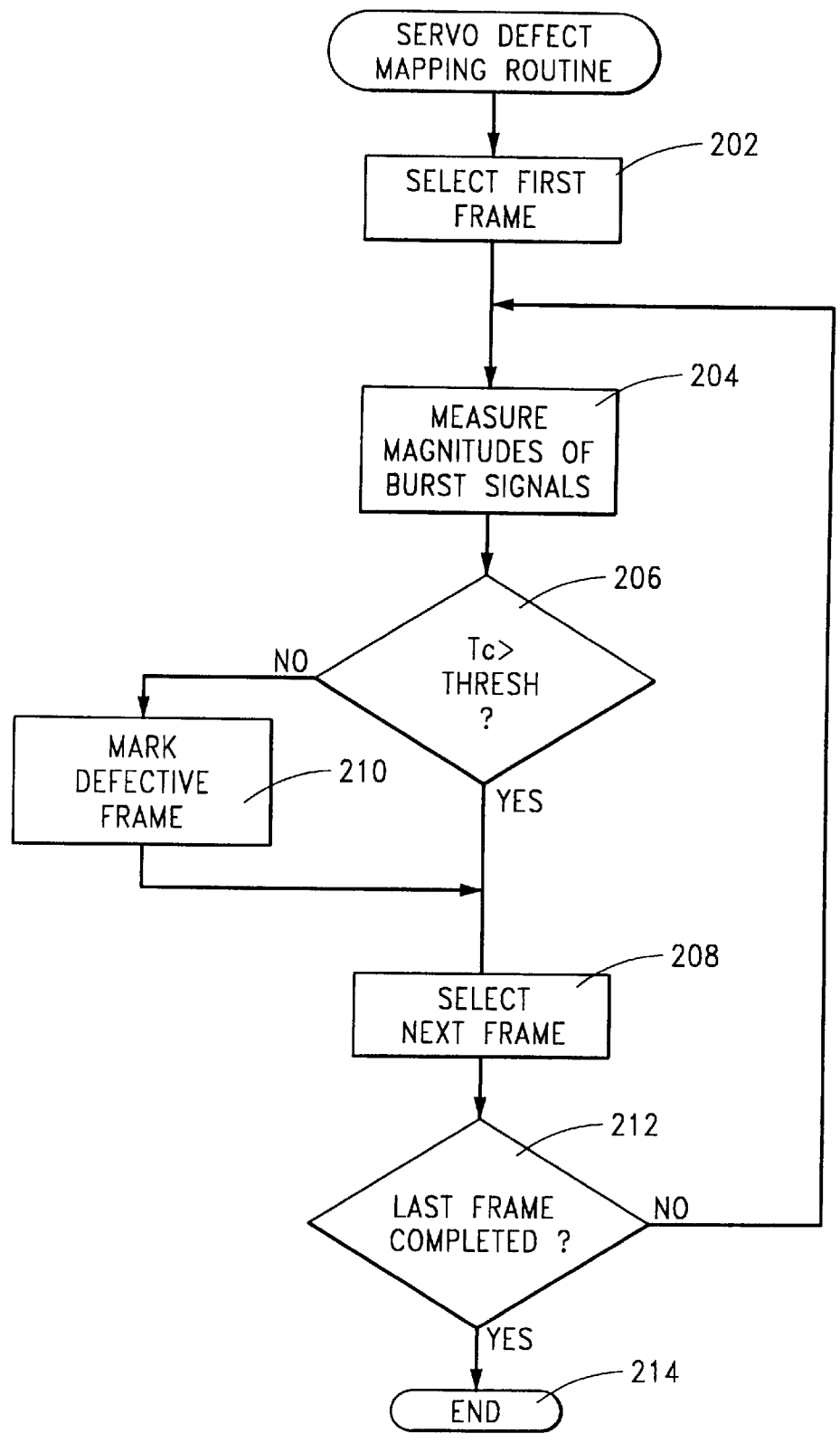
FIG. 8 is a generalized flow chart for a servo defect mapping routine, preferably stored in the form of programming in the servo RAM of FIG. 1 and executed by the servo microprocessor of FIG. 1 in accordance with the preferred embodiment of the present invention.

Turning now to FIG. 8, shown therein is a generalized a servo defect mapping routine, preferably stored in the form of programming in the servo RAM 158 of FIG. 3 and executed by the servo processor 156 of FIG. 3 in accordance with the preferred embodiment of the present invention.

Particularly, the routine of FIG. 8 is used to determine whether the patterns (such as the patterns 186, 188, 190 and 192 of FIG. 5) produce burst signals of sufficient magnitude to facilitate proper servo loop operation. It is contemplated that the routine will preferably be performed during manufacturing of the disc drive 100, although it can also be performed during field operation as desired. As described below, servo frames which fail the routine are identified as defective and marked accordingly.

The routine of FIG. 8 is shown to begin at block 202 wherein the first servo frame (such as the frame 70 of FIG. 4) is selected. As the routine is contemplated as being performed on all tracks of the disc drive 100, the operation of block 202 includes the selection of the first head (such as the head 118) and the performance of a seek operation whereby the servo control circuit 150 moves the head 118 over a first track (such as at the inner diameter of disc 118 of FIG. 3). Once over the first track, the servo control circuit 150 enters a track following mode of operation so that the head 118 is nominally disposed over the center of the first track and follows the first track as the disc 108 rotates. For reference, in an embedded servo system such as disclosed herein, each track will have from about 30 to 90 servo frames with user data disposed therebetween.

Once the first frame is selected, the routine of FIG. 8 continues to block 204 wherein, at such time that the first frame passes under the head 118, the magnitudes of the burst signals generated by the associated A, B, C and D patterns are measured. Once measured, a signal combination term $T_c$ is determined as follows:

$$T_c=|[(A+B)/2]-(C)| \quad (1)$$

for even tracks, and $$T_c=|[(A+B)/2]-(D)| \quad (2)$$

for odd tracks. The combination term $T_c$ is derived from the general observation that (A+B)−(C+D) will be close to zero for a good set of patterns. Although the combination term could readily be determined in an alternative manner to that presented in equations (1) and (2), such as $T_c=|(A+B)-(C+D)|$, the methodology of equations (1) and (2) has been found to be preferable due to intermittent signal values that have been received in a particular application when both C and D patterns are used in the same calculation.

Continuing with the routine of FIG. 8, the combination term is then compared to a predetermined threshold, as indicated by decision block 206. The threshold is selected based upon the requirements of a particular application, but generally represents the minimum acceptable value for the combination term which will allow proper operation by the servo control circuit 150. In the preferred embodiment, a population of combination terms from good servo frames are measured and the threshold is selected from this population; for example, the threshold can be advantageously selected as a value generally one-half of the minimum combination term in the population.

Should the combination term exceed the threshold, the frame is determined to be good and the routine continues to block 208, wherein the next frame to be tested is selected. Should the combination term not exceed the threshold, however, as shown in FIG. 8 the frame is determined to be defective and marked accordingly, as shown by block 210. The routine is thereafter repeated until all of the frames have been tested, as indicated by decision block 212, after which the routine ends at block 214.

The defective servo frame can be marked in a variety of ways known in the art, including being designated in a defect map used by the disc drive 100 during subsequent address allocations for data to be stored on the discs 108. The servo control circuit 150 can then ignore servo information provided by the defective frame when the associated head is caused to follow the track containing the defective frame and instead use estimates of head position, velocity and acceleration determined from the servo frame immediately preceding the defective servo frame. Additionally, the sector or sectors associated with each defective servo frame can be deallocated from future use by the disc drive 10.

From a review of equations (1) and (2) above it will be recognized that the routine of FIG. 8 is particularly well suited to detect defective servo frames having anomalous C or D patterns, but in some cases servo frames having anomalous A or B patterns might still provide a compensation term above the predetermined threshold and therefore may not be detected as defective frames. Accordingly, in such cases where it is important to ensure that the A and B patterns are also correct, the routine of FIG. 8 can be repeated with the additional use of a ½ track offset so that the servo control circuit 150 servos off of the C and D patterns and alternatingly tests the A and B patterns, using the following equations for the compensation term:

$$T_c = |[(C+D)/2] - (A)| \quad (3)$$

$$T_c = |[(C+D)/2] - (B)| \quad (4)$$

Finally, although for purposes of disclosure a quadrature servo configuration has been disclosed herein, it will be recognized that the present invention can readily be adapted for use with other servo system configurations.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a disc for the storage and retrieval of data by a read/write head adjacent the disc, the disc having prerecorded servo information defining a plurality of nominally concentric tracks on the disc, the disc drive further having a servo loop for using the servo information to control the position of the head with respect to the tracks on the disc, the servo information comprising a plurality of servo frames, each servo frame comprising a position field including a first pattern extending from a first track boundary to a second track boundary, a second pattern extending from a track centerline halfway between the first and second track boundaries to the first track boundary and a third pattern extending from the track centerline to the second track boundary, a method for detecting a defective servo frame comprising steps of:

generating burst signals from the first, second and third patterns of a selected servo frame associated with a selected track;

determining a combination term from a selected combination of the burst signals;

comparing the combination term to a predetermined threshold; and identifying the servo frame as defective when the combination term does not exceed the predetermined threshold.

2. The method of claim 1, wherein the burst signals comprise:

a first burst signal generated by the first pattern;

a second burst signal generated by the second pattern; and a third burst signal generated by the third pattern; and wherein the combination term is generated as the difference between the first burst signal and the average of the second and third burst signals.

3. The method of claim 1, wherein the servo information is organized in a quadrature servo configuration.

4. In a disc drive of the type having a disc for the storage and retrieval of data by a read/write head adjacent the disc, the disc having prerecorded servo information defining a plurality of nominally concentric tracks on the disc, the disc drive further having a servo loop for using the servo information to control the position of the head with respect to the tracks on the disc, the servo information comprising a plurality of servo frames, each servo frame comprising a position field including a first pattern extending from a first track boundary to a second track boundary, a second pattern extending from a track centerline halfway between the first and second track boundaries to the first track boundary and a third pattern extending from the track centerline to the second track boundary, the improvement comprising:

defective servo frame means for identifying defective servo frames of the drive, the defective servo frame means comprising:

combination term generation means, responsive to the head, for generating a combination term as a selected combination of burst signals generated from the first, second and third patterns of a selected servo frame;

comparison means, responsive to the combination term means, for comparing the combination term to a predetermined threshold; and defective servo frame identification means, responsive to the comparison means, for identifying the servo frame as defective at such time that the combination term does not exceed the predetermined threshold.

5. The improvement of claim 4, wherein the burst signals comprise:

a first burst signal generated by the first pattern;

a second burst signal generated by the second pattern; and a third burst signal generated by the third pattern; and wherein the combination term generation means generates the combination term as the difference between the first burst signal and the average of the second and third burst signals.

* * * * *